United States Patent [19]

Sims et al.

[11] Patent Number: 5,496,392

[45] Date of Patent: * Mar. 5, 1996

[54] METHOD OF RECYCLING INDUSTRIAL WASTE

[75] Inventors: Bobby H. Sims, Lonsdale; Carl T. Philipp, Hot Springs, both of Ark.

[73] Assignee: Enviroscience, Hot Springs, Ark.

[*] Notice: The portion of the term of this patent subsequent to Dec. 21, 2010, has been disclaimed.

[21] Appl. No.: 219,527

[22] Filed: Mar. 29, 1994

Related U.S. Application Data

[63] Continuation-in-part of Ser. No. 38,464, Mar. 29, 1993, Pat. No. 5,364,447, which is a continuation-in-part of Ser. No. 632,000, Dec. 21, 1990, Pat. No. 5,198,190.

[51] Int. Cl.$^6$ .................................................. C22B 7/00
[52] U.S. Cl. ................... 75/414; 75/586; 75/958; 75/959; 75/961; 588/234; 423/DIG. 18; 65/19
[58] Field of Search ............................ 75/414, 654, 586, 75/958, 959, 961; 420/582; 423/DIG. 18; 588/234; 65/19

[56] References Cited

U.S. PATENT DOCUMENTS 5,198,190  3/1993  Philipp et al. .......................... 420/582
5,364,447  11/1994  Philipp et al. .......................... 75/500

*Primary Examiner*—Melvyn Andrews
*Attorney, Agent, or Firm*—Peter A. Borsari

[57] ABSTRACT

The present invention relates to a process for the production of metal alloys, metal oxides and slag-based products, such as mineral wool, from industrial waste materials. More specifically, the present invention relates to a process for recycling industrial waste materials into valuable commercial products, including, pure metals, metal alloys, metal oxides, and a molten slag comprising non-reducible metal oxides which thereafter can be converted to vitreous fiber and shot. Industrial waste materials suitable for use in the present invention include metal-containing waste products, particularly inorganic hazardous waste materials. The present process accomplishes total recycling in such a manner that the entire industrial waste material is consumed and converted to useful products.

23 Claims, 2 Drawing Sheets

METHOD OF RECYCLING INDUSTRIAL WASTE

CROSS REFERENCE TO RELATED APPLICATION

This application is a continuation-in-part of application Ser. No. 08/038,464, filed Mar. 29, 1993, entitled Method of Recycling Hazardous Waste, now U.S. Pat. No. 5,364,447 which is a continuation-in-part of application Ser. No. 08/632,000, filed Dec. 21, 1990, entitled Method of Recycling Hazardous Waste, now U.S. Pat. No. 5,198,190.

FIELD OF INVENTION

The present invention relates to a process for the production of metal alloys, metal oxides and slag-based products, such as mineral wool, from industrial waste materials. More specifically, the present invention relates to a process for recycling industrial waste materials into valuable commercial products, including, pure metals, metal alloys, metal oxides, and a molten slag comprising non-reducible metal oxides which thereafter may be converted to vitreous fiber and shot. Industrial waste materials suitable for use in the present invention include, for example, hazardous and non-hazardous metal-containing waste products. The present process accomplishes legitimate recycling in such a manner that the entire industrial waste material is consumed and converted to useful products.

BACKGROUND OF THE INVENTION

For many years, little attention was directed to the preservation of the earth's environment and its natural resources, particularly its limited mineral resources. It generally was considered more economically feasible to mine metal ores and simply dump rich metal-bearing wastes into landfills, rather than to recover and recycle usable metals and other products from industrial waste materials, particularly those industrial wastes containing hazardous or toxic materials.

Public concern over environmental issues, particularly the disposal of hazardous wastes, the decreasing availability of landfill areas, and the continuing depletion of the earth's mineral resources, has risen significantly over the last decade. Additionally, economic pressures and the tightening of competition for the earth's natural resources have increased. Further, federal and state regulations regarding the use of the earth's natural resources and the disposal of hazardous waste materials have become more encompassing and more restrictive. As a result, industry has begun to take appropriate and decisive measures in order to minimize waste. One focus of scientific undertaking in this area has been the recycling of industrial wastes and the recovery and reuse of all commercially useful byproducts derived from industrial processes.

One prior approach commonly used in the disposal of industrial wastes, particularly hazardous industrial wastes, is to "stabilize" or "capture" the waste material in a generally non-leachable form, typically with a basic material, such as lime or cement. Such stabilized waste materials subsequently are buried in designated hazardous waste landfills. Another widely accepted technique for the disposal method of hazardous wastes is to incorporate these waste products into a glass-like matrix commonly referred to as a "slag". This "slag" typically was used as a substitute for natural rock aggregate in cement or asphalt compositions utilized in the paving of roads and the like.

The United States Environmental Protection Agency (EPA), as directed by, for example, the Resource Conservation and Recovery Act (RCRA) and the Comprehensive Environmental Response, Compensation, and Liability Act (CERCLA), defines and classifies certain wastes materials for controlled disposal. Moreover, the manner in which wastes materials are treated also are covered by EPA regulations. For example, the ultimate end use of the treated waste material, generally referred to as a secondary material, determines whether it still is within the definition of "solid waste" (and, therefore, a hazardous waste). The regulations include in the definition of "solid waste", those waste materials which have been diluted, treated or otherwise stabilized. More specifically, the regulations provide that secondary materials and products containing secondary materials, when applied to or placed on the land in a manner that constitutes disposal, continue to be defined as "solid waste" and also hazardous waste [§261.2(e) of RCRA]. In other words, waste materials which have been diluted, treated or otherwise stabilized, simply cannot be disposed or used as a replacement for any product which is typically used on the land in any form, but rather, are subject to EPA restrictions relating to solid/hazardous waste management. Consequently, the waste materials treated in the above-discussed methods continue to be defined as hazardous wastes, and, as a result, the methods discussed above have fallen into disfavor.

The EPA has developed a series of questions called "the recycling criteria" in order to analyze individual recycling operations and determine whether the operation is legitimate recycling or "sham" recycling. The difference is that legitimate recycling involves an economic benefit from the recycling of wastes while "sham" recycling evades proper hazardous waste management. Am economic benefit includes, for example, recycling the hazardous waste materials and extracting products of known commercial value. The "criteria" regulation further requires that the recycler must possess a demonstration of legitimate recycling known as the "burden of proof". If the recycler does not possess an adequate demonstration, then the default presumption is that the operation is "sham" recycling. When a waste material has been recycled legitimately, products derived therefrom are not considered a solid waste under RCRA, that is, such products are not used in a manner constituting disposal. In other words, products recovered from waste materials by legitimate recycling methods are not subject to RCRA permitting requirements for disposal. Such products include, for example, metals, metal alloys, metal oxides, slag-based products such as mineral wool, abrasives and glass frits for use in roofing granules, glass ceramics or ceramic glaze/colorants.

The United States Environmental Protective Agency presently categorizes a number of waste material by the following designated series: D, F, K, P and U. Many waste materials are not classified as being hazardous wastes, although it is expected that the list of classified hazardous wastes will enlarge with time. Currently, a substantial number of waste products, generally recognized as unsafe for conventional disposal, are not yet under EPA scrutiny and restrictions. For example, certain anodizing wastes, such as EPA designated waste F019, are presently listed as wastes, but not classified as hazardous wastes. Further, sand used in blasting operations which may be contaminated with nickel, chrome, or other metals generally considered toxic, and baghouse dusts which often contain carbon and hazardous materials, have no separate classification under the current law. Consequently, such wastes are discarded without meaningful disposal precautions, despite the fact that they are widely believed to create hazards to the environment. Moreover, their disposal results in the unnecessary depletion of existing natural mineral resources.

There are numerous methods for disposing of wastes materials, particularly hazardous waste materials, currently known and practiced in the prior art. For example, U.S. Pat. No. 4,432,666 to Frey describes a process for storing and dumping hazardous wastes. U.S. Pat. No. 4,793,933 to Rostoker teaches a method for treating metal hydroxide electroplating sludges by fusion of the oxides of the metals into silica and sodium slag. The Rostoker method relates to earlier EP Leaching standards and has been proven incapable of achieving minimal-waste recycling. U.S. Pat. No. 4,480,671 to Lynn relates to the stabilization of EAF dusts for disposal by use of calcium hydroxides as entrapping agents for toxic cadmium, chromium, and lead constituents. Lynn suggests combining and processing various and distinct waste products in order to produce "safe" compounds.

The prior art also is replete with methods for producing useful commercial products from various industry wastes. Such products include furnace fuels, paving aggregates, sealing compounds, and mineral wool.

Mineral wool is a term broadly applied to various related vitreous products commonly used for insulation, padding, ceiling tile production, and the like. In general, mineral wool is a fiberglass-like material composed of very fine, interlaced mineral fibers, somewhat similar in appearance to loose wool. It is composed primarily of silicates of calcium and aluminum, chromium, titanium, and zirconium. Typically, mineral wool is produced from natural rock or slag. Slag is a term broadly applied to refer to waste products of the primary metal and foundry industries, including deposits from the furnace lining charge impurities, ash from fuel, and fluxes used to clean the furnace and remove impurities. Although metal producers and foundries strive to control the amount of slag, excess slag may result from the refining of metals.

Slags are classified as either "acid" (i.e. high silicate) slags or "basic" slags, depending upon the relative quantities of acidic and basic sub-components. For example, typical acid slags contain between forty and fifty percent (40.0 to 50.0%) of acidic subcomponents, such as silicon dioxide ($SiO_2$), from twenty-five to forty-five percent (25.0 to 45.0%) of basic sub-components, such as the oxides of calcium (CaO) and magnesium (MgO), and from ten to twenty percent (10 to 20%) of alumina $Al_2O_3$. A typical basic slag that is used to reilne or reduce metals comprises between twenty-five and fifty percent (25.0 to 50.0%) acidic subcomponents such as silicon dioxide ($SiO_2$) and alumina ($Al_2O_3$), and a relatively high percentage, between thirty-four and fifty percent (34.0 to 50.0%) basic subcomponents, such as the oxides of calcium (CaO) and magnesium (MgO). Magnesium may be added to increase the basicity of the slag. Basicity is the tool used to determine the metal quality using basic slag. Basicity is calculated as follows: $CaO+MgO/Al_2O_3+SiO_2$. The basicity of typical basic slags ranges between 0.93 and 1.9.

Typically, metal producers are interested in the highest quality metals with the least amount of slag production since traditionally it is expensive to melt slag, and the slag is of little value or it is an environmental liability. Because high quality scrap metal is abundant, modem metal producers prefer to use acid slags and not refine metals. For premium results, mineral wool producers seek slags or rock that can be blended together and melted at relatively low temperatures. Preferable the mineral wool slag will contain no reducible metals, or will be an acid slag that will eliminate metal buildup in the furnace.

Mineral wool is classified according to the raw materials used in its production. For example, Rock Wool is produced from combinations of natural rocks and/or minerals. Slag Wool comprises a composition of iron, copper and lead slags typically removed from blast furnaces, and may contain some fluxing materials. Glass Wool (fiberglass) is composed principally of silica sand, soda ash, and limestone, Refractory (high-temperature) or "Certa" wools may be made from the oxides of aluminum, chromium, zirconium, or titanium and silica sand. Further subclassifications of these products relate to the quality or purity of the wool. For example, slag wool is subclassified for purity according to color: black, gray, and white wools are available. The tool for determining the quality of mineral wool produced from a slag charge is the acid-to-base ratio (A:B). The formula for determining A:B is $Al_2O_3+SiO_2/ CaO+MgO$. In a typical mineral wool derived from cupola slag, the acid-to-base ratio ranges between 0.74 and 2.316.

Prior art patents relating to the production of mineral wool using various waste products include U.S. Pat. No. 4,822,388 to Gee and U.S. Pat. No. 4,484,211 to Monaghan. Monaghan discloses a method and apparatus for melting discarded fly ash and spinning it into mineral wool. However, non of the prior art known to us teaches viable methods for recycling EPA designated wastes, particularly hazardous materials, containing waste metal oxides such as chromium, nickel, cadmium, zinc, copper, iron, and lead oxides or hydroxides, into pure metals or alloys while producing mineral wools from non-reducible metal oxides, such as the oxides of aluminum, silica, calcium, zirconium, and titanium.

Methods for the treatment, recovery and recycling of waste materials also are well known in the prior art. For instance, U.S. Pat. No. 3,870,507 to Allen is directed to a method for forming briquettes from steel mill wastes (such as steel and iron dust, mill scale and iron oxides) with an organic binder, in order to reduce slags formed during recycling. The resulting iron oxide briquettes are recycled by being fed into the production furnaces with new materials in the steel-making process.

U.S. Pat. No. 4,004,918 to Fukoka teaches a method for treating certain wastes resulting from stainless steel operations. In Fukoka, briquettes are formed from the dust and scale from stainless steel ovens and combined with organic and inorganic binders. The briquettes are returned to the existing electric are furnace, and usable metals are extracted for further use in making stainless steel.

U.S. Pat. No. 4,053,301 and 4,396,423 to Stephens relate to a process for the recovery of iron carbide and zinc metals from BOF dusts resulting in the steel-making process. The Stephen's system reduces the dust wastes within a fluidized bed reactor in the presence of carbon, recovers zinc by vaporization, and produces iron carbide and gangue, a worthless rock or matter in which metals are contained.

U.S. Pat. No. 4,758,268 and 4,836,847 to Bishop disclose apparatus and processes for reclaiming metals from electric arc furnace and BOF dusts. The systems described therein are directed to providing recovery of metals from EAF wastes in a reducing environment. In the Bishop method, carbon is added to the molded briquettes to reduce the iron and zinc content of the waste. However, the process is incapable of producing a slag suitable for use in the production of mineral wool, since the process attempts to minimize slags to less than 8%. Moreover, the Bishop system specifically is described as being unsuited for rotary kilns, shaft furnaces, retorts, and fluidized bed furnaces.

Despite the many treatment and recycling processes known in the prior art and discussed above, a need still exists for providing a method of legitimate recycling, wherein industrial waste materials, including hazardous waste materials, can be effectively recycled in such a manner that the waste material is consumed and as much usable material as possible is recovered and convened to viable commercial products. Such a method must effectively eliminate waste, conserve natural resources and avoid costly liability. Moreover, such a process should be capable of being carried out with equipment and apparatus already available in the industry.

SUMMARY OF THE INVENTION

The present invention relates to a process for the production of metal alloys, metal oxides and slag-based products, such as mineral wool, from industrial waste materials. More specifically, the present invention relates to a process for recycling industrial waste materials into valuable commercial products, including pure metals, metal alloys, metal oxides, and a molten slag comprising non-reducible metal oxides which thereafter can be converted to vitreous fiber and shot. Industrial waste materials suitable for use in the present invention include metal-containing waste products, particularly inorganic hazardous waste materials. The present process accomplishes total recycling in such a manner that the entire waste material is consumed and converted to useful products.

The present invention provides a process for recycling industrial wastes wherein said wastes are blended with (1) at least one carbon reducing agent, (2) optionally, at least one aluminum reducing agent and (3) at least one primary fluxing agent, into a homogenous, semi-solid mass. The resultant mass is shaped into predetermined shapes and sizes, cured and dried. The dried particles are heated at high temperature wherein volatile metals are volatilized, and the carbon, and optionally aluminum, within the particle, creates a reducing atmosphere such that the reducible metals contained therein are reduced. As the particles melt, a molten slag comprising non-reducible metal oxides is formed which may be subsequently used to produce mineral wool. By the process of the present invention, pure metals and metal alloys (reducible metals), metal oxides (volatile reducible metals) and man-made vitreous fiber (non reducible metals), as well as exhaust products such as carbon dioxide, are produced from the industrial wastes. In one embodiment of the present invention, the carbon and aluminum reducing agents and the primary and secondary fluxing agents are derived from commercial sources. In another embodiment of the present invention, the carbon and aluminum reducing agents and the primary fluxing agents are derived from industrial waste materials. In this latter embodiment, the entire process utilizes only waste materials and does not require the consumption of any commercial products.

In the process of the present invention, total recycling is accomplished by reclaiming metals and metal oxides from hazardous industrial wastes and by producing mineral wool from slags. A particular advantage of the present invention is that the instant process may be utilized with a variety of standard industrial equipment currently in use.

Accordingly, it is an object of the present invention to provide a viable method for the legitimate recycling of industrial wastes.

It is a further object of the present invention to provide a commercially valuable method for recycling hazardous and non-hazardous waste.

It is another object of the present invention to provide a legitimate recycling process which meets the recycling criteria requirements set forth by the United States Environmental Protection Agency.

It is an additional object of the present invention to provide a recycling process that protects the environment and preserves valuable mineral resources.

It is still another object of the present invention to provide a method for recovering metals, metal alloys and metal oxides from hazardous wastes.

It is an additional object of the present invention to provide a method for recycling waste that may be practiced using existing industrial systems and apparatus.

It is yet another object of the present invention to provide a waste recycling method that combines various hazardous and non-hazardous wastes to produce commercially valuable products.

It is still another object of the present invention is to provide a method for recycling hazardous wastes to produce mineral wool.

It is another object of the present invention is to provide a waste recycling method that produces no hazardous byproducts.

Additional objects, advantages and novel features of the invention will be set forth in part in the description which follows, and in part will become apparent to those skilled in the art upon examination of the following specification or may be learned by practice of this invention.

BRIEF DESCRIPTION OF THE DRAWINGS

The present invention will be better understood with reference to the appended drawing sheets, wherein.

DETAILED DESCRIPTION

Figure 1:
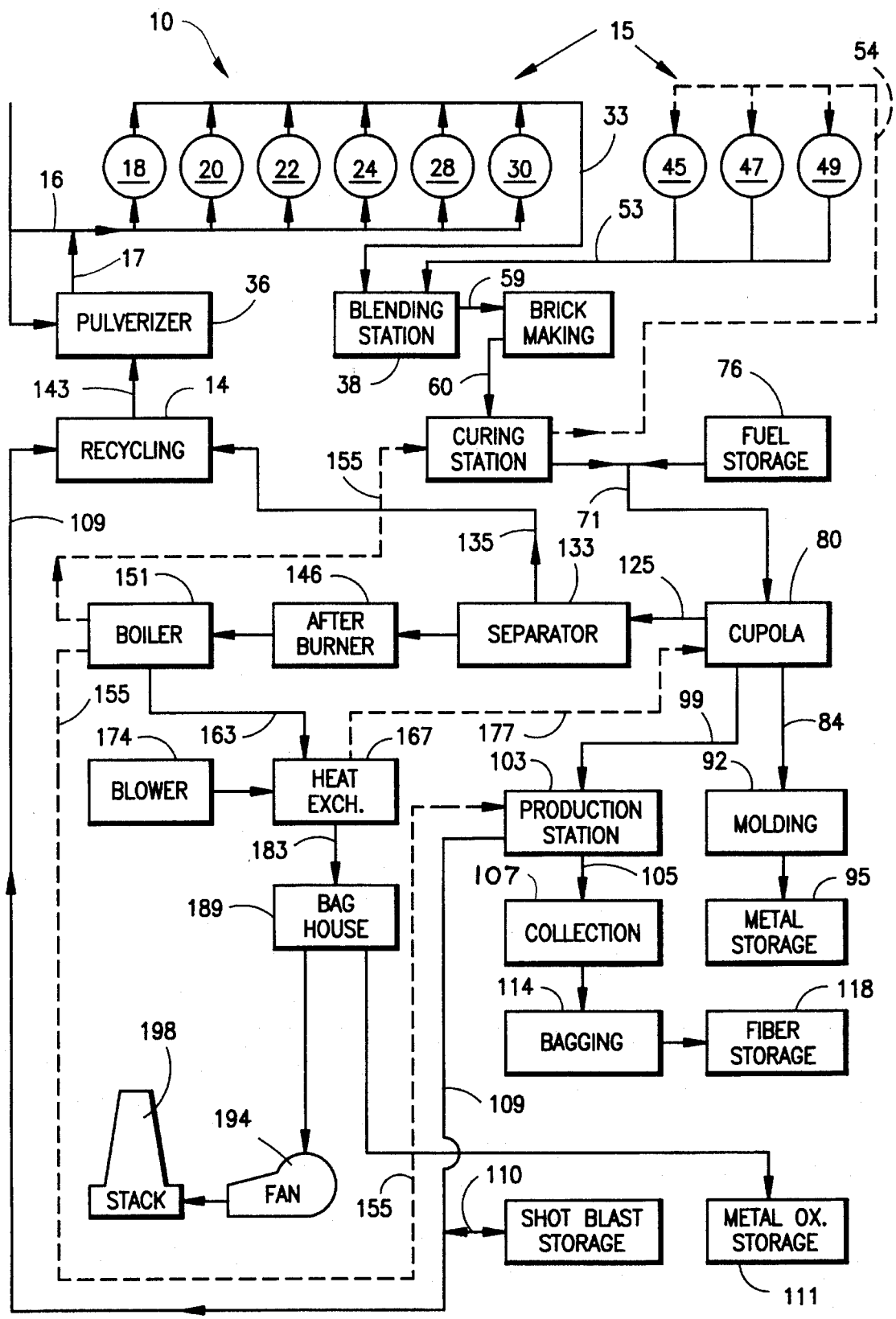
FIG. 1 shows a block diagram of the process of the present invention wherein a coke-fired shaft furnace is employed.

The present invention relates to a process for recovering reducible metals, volatile metals, non-reducible metals, and exhaust products such as carbon dioxide, from industrial waste materials, particularly inorganic waste materials, including hazardous and nonhazardous wastes. More specifically, the present invention relates to a process for recycling industrial waste materials comprising the following steps:

a) blending (1) one or more metal-containing industrial waste materials, (2) at least one carbonaceous reducing agent and (3) at least one primary fluxing agent, into a homogenous semi-solid mass;

b) forming said mass into particles;

c) curing and drying the resulting particles at a temperature of from about 170° to 240° F. for a period of time such that resulting particles have a moisture content of less than 10.0%;

d) heating and melting the resulting particles at a temperature of from about 1,660° to about 3,100° F. such that a reducing atmosphere is created within the structure of the particles from the release of said reducing agent; and e) separating and recovering (1) reducible metals, (2) volatile metal oxides, (3) exhaust products, and (4) a molten slag comprising non-reducible metal oxides, from the heating and melting step (d).

The blend prepared in step (a) further may comprise other ingredients, including, for example, one or more aluminum reducing agents, one or more binding agents, and one or more secondary fluxing agents. The incorporation of an aluminum reducing agent into the blend is preferred when the starting industrial waste materials contain metals which melt at high temperatures, such as chromium and vanadium, since aluminum reduces these metals far more efficiently than carbon alone.

Binders, including both inorganic and organic binding agents also may be used in the process of the present invention in order to stabilize and harden the particles formed from the blended mass. Suitable binders include, but are not limited to, cyanides, starch, sugar processing wastes and byproducts, chromic acid (when cyanide is not present in the formulation) and certain organics such as oils and greases, as well as organic cleaners that are used to remove oil and grease from metals in the metal finishing industry, and non water-soluble binders, such as still bottoms and tars. Certain binders are not suitable for use in the present invention, including, for example, binders that contain large amounts of magnesium oxide, manganese oxide, phosphorous and sulphur. Large concentrations of magnesium oxide and manganese oxide can result in a molten slag that does not form particularly good vitreous fiber. Additionally, phosphorus and sulphur in the metals lowers the metals value unless these elements are removed in a ladle or a secondary furnace.

In addition to the primary fluxing agent(s), one or more secondary fluxing agents may be incorporated into the blend in order to modify the viscosity of the slag resulting from the melting of the particles. Suitable secondary fluxing agents include, for example, soda ash and fluorspar.

Once the particles have been heated, the reducing agent(s) in the particles produce a reducing atmosphere such that reducible metals are separated from the resulting molten slag and recovered in the form of pure metals and metal alloys. Volatile metals are volatilized in the presence of carbon and escape the charge material, along with other exhaust products. These volatile metals and exhaust products are conveyed to an afterburner and oxidized to form volatile metal oxides and carbon dioxide.

The remaining molten slag comprises metals that were not reduced or volatilized, including, for example, the oxides of silicon, calcium, aluminum, chromium, titanium and zirconium. Typically, the molten slag also may contain small quantities of magnesium oxide (MgO) and manganese oxide (MnO); however, it is desirable that the percentage of these latter metal oxides should be as low as possible. The molten slag may be transferred to a mineral fiber production station for preparing vitreous fiber. Silicon dioxide ($SiO_2$), calcium oxide (CaO), and at least one other oxide listed above, preferably alumina ($Al_2O_3$) are necessary to produce a suitable vitreous fiber from the molten slag. Unspun slag particles (i.e., "shot") that remain from the production of mineral wool may be either recycled into the system or sold. For example, these unspun slag particles may be sold for shot blast material.

Heat from the exhaust gases produced in the instant process may be recycled into the process in order to reduce fuel consumption. When air is used in a coke-fired furnace, the larger solids also may be recycled into the process.

Additionally, water extracted from the process may be recycled. Preferably, total recycling is accomplished by extracting metals and metal oxides from the hazardous industrial wastes, producing mineral wool from molten slag and recycling heat, exhaust products and shot.

Inorganic industrial waste materials suitable for use in the present invention may be derived from numerous sources and particularly include, for example, metal-containing wastes. Many such waste materials additionally contain a source for the carbon reducing agent and/or aluminum reducing agent, as well as primary and/or secondary fluxing agents and binders. More specifically, the starting materials (i.e. metal-containing wastes, reducing agents and fluxing agents) used in the process of the present invention may be derived solely from industrial waste materials. Suitable industrial wastes materials which may be utilized by the instant process are listed and categorized in Table 1.

The industrial waste materials listed in Table 1 can be categorized as solids, for example, dry dusts from electric arc furnaces, such as EPA designated waste K061, free-standing sludges comprising twenty-five to fifty percent (25–50%) solids, and metal-bearing liquid wastes, such as EPA designated wastes K062, P021, P029, P030, P074, P104 P106, P121, F007, F009, F011, and water-soluble oils. EPA designated wastes, K004, F006, P121 and P122 may exhibit an identical chemical analysis, but have different EPA waste codes. Additionally, K005, K006 and K008 may resemble a certain F006 specification, and each may be used interchangeably. Each of the designated EPA waste codes listed in Table 1 contains either a primary flux, such as calcium oxide and calcium hydroxide, or a secondary flux, such as sodium (hydroxide) or fluorides. Waste materials designated K088, K045, P021, P030 and P106 in Table 1 contain stable carbon (i.e. fixed carbon) and may be used as a source for the carbonaceous reducing agents in the present process. Most of these latter materials additionally comprise fluxing agent metals; for example, K088 contains sodium and fluoride, P021 contains calcium, and P030 and P106 contain sodium.

TABLE 1

EPA Classified Wastes

| EPA | Definition/Source |
|---|---|
| K004 | Waste water treatment sludge from production of zinc yellow pigments. |
| K005 | Waste water treatment sludge from production of chrome green pigments. |
| K006 | Waste water treatment sludge from production of chrome oxide green pigments. |
| K007 | Waste water treatment sludge from production of iron blue pigments. |
| K008 | Oven residue from the production of chrome oxide green pigments. |
| K045 | Spent carbon from the treatment of waste water containing explosives. |
| K061 | Emission control dust/sludge from production of steel in electric furnaces. |
| K062 | Spent pickle liquor from steel finishing operations which use Chlorine. |
| K069 | Emission control dust/sludge from secondary lead smelting. |
| K088 | Spent aluminum potliner. |
| P021 | Calcium cyanide |
| P029 | Copper cyanide |
| P030 | Cyanides (soluble cyanide salts), not otherwise classified. |
| P074 | Nickel cyanide |
| P104 | Silver cyanide |
| P106 | Sodium cyanide |
| P121 | Zinc cyanide |
| P122 | Zinc phosphide, if greater than ten percent |

TABLE 1-continued

EPA Classified Wastes

| EPA | Definition/Source |
|---|---|
| U032 | Calcium chromate |
| U249 | Zinc phosphide (concentrations less than 10%) |
| D006 | Cadmium, if greater than 1 mg/L total leachate |
| D007 | Chromium, if greater than 5 mg/L total leachate |
| D008 | Lead, if greater than 5 mg/L total leachate |
| D011 | Silver, if greater than 5 mg/L total leachate |
| F006 | Waste water treatment sludges from electroplating |
| F007 | Spent cyanide plating bath solutions from electroplating operations |
| F008 | Plating bath residues from the bottom of plating baths from electroplating cyanides |
| F009 | Spent stripping and cleaning bath solutions from electroplating cyanides |
| F010 | Quenching bath sludge from oil baths from metal heat-treating operations using cyanide |
| F011 | Spent cyanide solutions from salt bath pot cleaning from metal heat-treating operations |
| F012 | Quenching waste water treatment sludges from metal heat-treating operations using cyanides |
| F019 | Waste water treatment sludges from the chemical conversion coating of aluminum |
| F024 | Wastes, not limited to, distillation residues, heavy ends, tars, and reactor clean-out wastes from chlorinated aliphatic hydrocarbons, having carbon content from one to five, utilizing free-radical catalyzed processes. |

In addition to the waste materials listed in Table I, other wastes suitable for use in the present invention include sand from casting or blasting operations, slags, and calcium-stabilized wastes. Calcium-stabilized wastes may comprise a variety of ingredients, including both reducible and non-reducible metals, metal oxides, hydroxides and/or organics. A typical calcium-stabilized waste formulation is provided in Table 2.

TABLE 2

Calcium-Stabilized Wastes

| Ingredient | Percent of Material |
|---|---|
| CaO | 41.2 |
| Ignition Loss | 32.7 |
| $Al_2O_3$ | 1.7 |
| $Si_2O_3$ | 13.1 |
| $Fe_2O_3$ | 4.47 |
| Total Solids | 69.24 |
| Organics | 4.61 |
| As | 0.000792 |
| Cd | 0.00171 |
| Cu | 0.0549 |
| Hg | 0.000207 |
| Ag | 0.000298 |
| Ba | 0.567 |
| Cr | 0.275 |
| Pb | 0.0514 |
| Ni | 0.0225 |
| Zn | 0.197 |

It is essential that the blend include at least one carbonaceous reducing agent. The term "carbonaceous" is meant to include any source from which carbon can be obtained for use as a reducing agent. The source of carbon can be derived from numerous waste materials or by-products, as well as commercial forms of carbon. For example, the carbonaceous reducing agent may be in the form of a standard granulated carbon product, such as activated carbon, coke breeze, carbon or pet coke used to produce electrodes, and the like. Activated carbon is used to remove hazardous materials from both air and water, resulting in "spent" carbon. The "spent" carbon thereafter bears the hazardous waste code of the element or organic adsorbed/absorbed onto/into the carbon.

Preferably, the carbonaceous reducing agent is derived from waste materials, such as baghouse dusts, coal and coke fines, as well as carbonaceous EPA designated wastes, including, for example, K088, K045, P021, P030 and P106, each of which contains stable (i.e. fixed) carbon. Many baghouse dusts contain large amounts of carbon but are not necessarily classified as a hazardous waste materials. They are particularly useful in the present process not only because they contain the carbonaceous reducing agents, but also because baghouse dusts contain other desirable materials, including, for example, reducible metals, volatile metals, aluminum oxide, calcium oxide, silicon dioxide and the like.

Another suitable source of the carbonaceous reducing agent is the present process is spent aluminum potliner (SPL) from the primary aluminum industry, denoted EPA designated waste K088. SPL has been determined to be hazardous because it contains cyanide. Due to this cyanide content, EPA designated wastes K007, F010, F011, and F012 have been identified as hazardous; further, this presence of cyanide is a major problem when treating or stabilizing EPA designated wastes F006, F007, F008, and F009 before land filling. It has been found that SPL (K088) is a superior agent to be used in the process of the present invention because it contains both fixed carbon and aluminum reducing agents, alumina for use as a slag modifier and two secondary fluxes: sodium and fluoride.

Processes for primary aluminum production vary within the industry, but a common factor is the use of a material known as hall bath or cryolite ($Na_2AlF_6$ or $Na_3AlF_6$) which is used as the reduction bath within a furnace (pot). Electrodes made of carbon are inserted into the furnace from the top or carbon powder is floated on top of the cryolite to conduct electricity through the cryolite. The bottom and sides of the furnace are also lined with carbon to hold the cryolite and conduct electricity though the cryolite. Most plants use iron or steel plates to conduct electrical current into the carbon that lines the pot. Typically these are called collector bars. The pot has fire brick as an insulator between the inside of the pot (carbon) and the outside of the pot (steel). The carbon lining of the pot is termed "first cut" material whereas the brick, vapor barrier and leveling agents are termed "second cut" material.

In operation, as the pot is used, cryolite soaks into the carbon lining (first cut) and down to the "vapor barrier". When cryolite contacts iron or steel sheets in the presence of air, cyanide is formed. The reaction between the nitrogen in the air and the carbon of the lining occurs as follows:

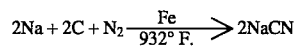

Moisture in the air or the water used to soak the pot before the lining is removed can cause the following reaction around the collection bars, pot shell, and lining:

This hexacyanide compound, $Na_4Fe(CN)_6$, commonly known as yellow prussiate of soda, is used in blue-green inks and dies. When a pot is cleaned (dry), an inspection will reveal this highly stable hexacyanide as a bright yellow dust on the black carbon background. A typical first cut SPL consists of the components listed in the following Table 4.

TABLE 4

First Cut SPL

| Element | Content/weight | Element | Content/weight |
|---|---|---|---|
| Carbon | 45.0–65.0% | Potassium | 0.25–0.70% |
| Fluorine | 8.00–12.0% | Lithium | 0.30–0.25% |
| Sodium | 6.00–10.0% | Magnesium | 0.50–1.50% |
| Aluminum | 3.00–8.00% | Silicon | 2.50–4.50% |
| Nitrogen | <1.00% | Strontium | 0.00–0.25 |
| Calcium | 3.00–6.00% | Titanium | 0.00–0.25% |
| Iron | 0.50–1.20% | Sulphur | 0.10–0.30% |
| Cyanide | 0.03–0.20% | | |

The second cut material, primarily fire brick, typically has no hazardous materials contained within it. A typical analysis of the second cut is provided in Table 5:

TABLE 5

Second Cut SPL

| Element | Content/Weight | Element | Content/Weight |
|---|---|---|---|
| $SiO_2$ | 47.0–50.0% | $P_2O_5$ | 0.10–0.20% |
| $Al_2O_3$ | 28.0–52.0% | $Na_2O$ | 0.02–0.95% |
| $Fe_2O_3$ | 1.00–2.20% | $K_2O$ | 3.00–6.00% |
| CaO | 0.00–2.00% | Co | 0.03% |
| MgO | 0.00–0.30% | Cl | 5.00–15.00 ppm |
| $SO_3$ | 0.10–0.90% | F | 0.12–0.60% |
| $TiO_2$ | 0.25–1.25% | | |

The second cut material has been melted and spun directly into a high temperature fiber without the benefit of smelting or use of additives to the process. The submerged or plasma arc furnace can be used for this process. When lime stone and small quantities of silica (sand) are added, a lower temperature mineral wool is created.

The SPL produced (or buried on location) at many primary aluminum producer's plants is mixed as first and second cuts and is not readily separated. This material's carbon content may be as low as about 13.0% or as high as about 35.0% with grab sampling. The chemical content of mixed SPL varies little at a given producer's plant. A grab sample of the first cut and the second cut can be mathematically blended to show the total content of the pot since the weight of mixed SPL results from about 50% in the first cut and about 50% in the second cut.

Based on the foregoing discussion, it can be seen that mixed SPL provides carbon and aluminum reduction agents, alumina, some silica and provide two secondary fluxing agents.

The carbonaceous reducing agent reduces iron, nickel, tin, cadmium, copper, chrome and zinc metals at higher temperatures. The carbon removes the oxides from metals and forms carbon monoxide (CO) gas. This CO gas, while escaping from the briquettes, removes other oxides from metals to form carbon dioxide ($CO_2$) gas. The metal reduction reaction begins at about 1700° F. but is most efficient at about 2200° F. It has been discovered that briquettes formed with powdered waste carbon from a baghouse will reduce iron, nickel, tin, cadmium, copper, chrome and zinc prior to the briquette melting. A standard granulated carbon product does not work as well in reducing these metals. It is believed that the reason for this difference is that a very efficient solid to solid (metal oxide to carbon) reaction or reduction process occurs with the finely divided dust. Reduction of metals by the method of the present invention is significantly faster than by use of a standard blast furnace. The CO reduction process in a blast furnace typically takes seven to eight hours to complete. In contrast, metals are reduced by the process of the present invention in twenty minutes or less at about 1800° F.

When the waste material contains large quantities of chrome or vanadium, it is preferable to add an aluminum-containing reducing agent since aluminum can reduce metals with higher melting temperatures more efficiently than carbon.

Typical primary fluxes include calcium oxide, calcium hydroxides and silica dioxide in its various forms. Calcium is an essential flux in the present recycling process since the present invention produces mineral wool from the resulting slag. Calcium imparts beneficial qualities to the mineral wool product. While virgin calcium, lime or similar calcium-based materials may be used, it is preferred that the source of calcium be derived from calcium-stabilized wastes, such as metal sludges stabilized with calcium oxide or lime. Calcium raises the pH of the slag and reduces the reoxidation of reduced metals after reduction. Additionally, calcium lowers the eutectic point of the waste mixture, and fluxes metals or alloys as it removes sulfur.

Calcium is found in most of the waste materials listed in Table 1, for example, EPA designated wastes F006, F007, and F009, as well as P029, F030, U032, D006, D007, D011, F012, and F019. The reason that calcium is found in all or most of the "F" and "D" series waste is that lime is commonly used in the same way as sodium hydroxide to remove the contaminants from the water and produce sludge. The sludge is "stabilized" with lime prior to landfill disposal in order to contain the hazardous materials in the sludge. Some waste materials, such as high lime EPA designated waste KO61, may contain all the calcium required to form the homogenous mass into particles, but must be prehydrated prior to particle formation. Without pre-hydration, EPA waste K061 having a high calcium content will cause an exothermic reaction within the particle, produce steam and the briquette will expand and fall apart before curing.

Secondary fluxing agents used in most smelting operations primarily function to change the viscosity of the slag. As the temperature of the slag increases, it becomes less viscose. However, in cold spots, such as the furnace walls and coke in shaft furnaces, the slag becomes sticky and viscous, thereby causing bridging, channeling and a thick crust on furnace walls. Secondary fluxes modify the viscosity of the slag at lower temperatures, thereby cleaning the walls of a furnace and coke in shaft furnaces. The addition of the secondary fluxing agent also encourages the melting metal to fall quickly to the bottom of the furnace, instead of flowing out with the slag.

Standard secondary fluxes include, for example, soda ash and fluorspar, and are used in metallurgical furnaces as the secondary fluxing agents. Soda ash ($Na_2CO_3$) is calcined in the furnace to create $Na_2O$, resulting in a secondary flux that is strongly basic. Fluorspar ($CaF_2$) is considered a neutral flux which works on the silicate network of the molten slag. In the presence of fluoro-compounds, such as fluorspar, the $SiO_2$ in the molten slag can be converted to $SiF_4$ as the slag becomes more acidic. As the molten slag becomes more basic, the fluoride is present in the form of fluoride ions.

In addition to calcium, other binders may be used to stabilize and harden the particles formed from the blended mass. Such binders may be derived from the starting waste materials. A preferable waste material which may be used as a binder is a cyanide-containing waste. Suitable cyanide wastes additionally may contain metals and/or a sodium flux. Examples of cyanide salts that may be used in the present process are listed in the following Table 3.

TABLE 3

Cyanide Salts Used In Process

| Cyanide Form | EPA ID Numbers |
|---|---|
| NaCu(CN)$_2$ | F006, P029, F007, F008, F009 |
| Na$_2$Zn(CN)$_4$ | F006, P121, F007, F008, F009 |
| Na$_4$Ni (CN)$_6$ | P074 |
| Na$_3$Fe(CN)$_6$ | F006, K088, F007, F008, F009, F011, F012 |
| Na$_4$Fe(CN)$_6$ | F006, K088, F007, F008, F009, F010, F011, F012 |
| NaAg(CN) | P104 |
| NaCd(CN)$_2$ | F006, F007, F008, F009 |

Cyanide is found in two primary forms: water-soluble (free) and non-water soluble (fixed). Water-soluble cyanide reacts with water in the following manner:

$$NaCN + H_2O \leftrightharpoons NaOH + HCN.$$

In water at a high pH, the NaOH and HCN are in equilibrium. When the pH shifts toward the acid side organic cyanide, i.e. HCN, is released as a deadly gas which can be burned. Accordingly, the process of the present invention does not allow HCN to be formed but uses the carbon as a fixed reducing agent. The non-formation of HCN is accomplished by the addition of calcium, which keeps the cyanide (fixed) stable during the curing and drying steps.

Non-water soluble cyanides and fixed cyanide salts are very stable up to 2,786° F. and also can be used directly as a carbon source for any metal having a reduction point below such temperature. When water soluble cyanide is in the crystalline form (fixed), the reactions are the same as with non-water soluble cyanide. Open air combustion or incineration results in the following reaction on sodium copper cyanide:

$$2NaCu(CN)_2 5O_{2-1450°\ F.} \rightarrow 4Cu + 2NaCN + 2CO + N_2$$

Another advantage in using cyanide waste material is that the carbon in cyanide acts as a fixed carbon source in the metal-reduction process. Importantly, no cyanide is detected in the slag or the metals after processing. Any cyanides present in the air stream, typically less than 0.13% of the cyanide in the charge, are destroyed in the afterburner and are not emitted. The reduction within the briquette in the absence of oxygen and with the addition of copper oxide can be represented by the following reaction:

$$2CuO + 2NaCN + 2CuCn - 1700°\ F. \rightarrow 4Cu + 2NaCN + 2CO + N_2$$

The above reaction gives, by mole weight, two sodium molecules which can be used as a secondary flux in the form of sodium oxide for the slag, four copper molecules, two carbon monoxide molecules for reduction of other metals, two cyanides for further reduction reaction and releases $N_2$ back to the atmosphere.

Figure 2:
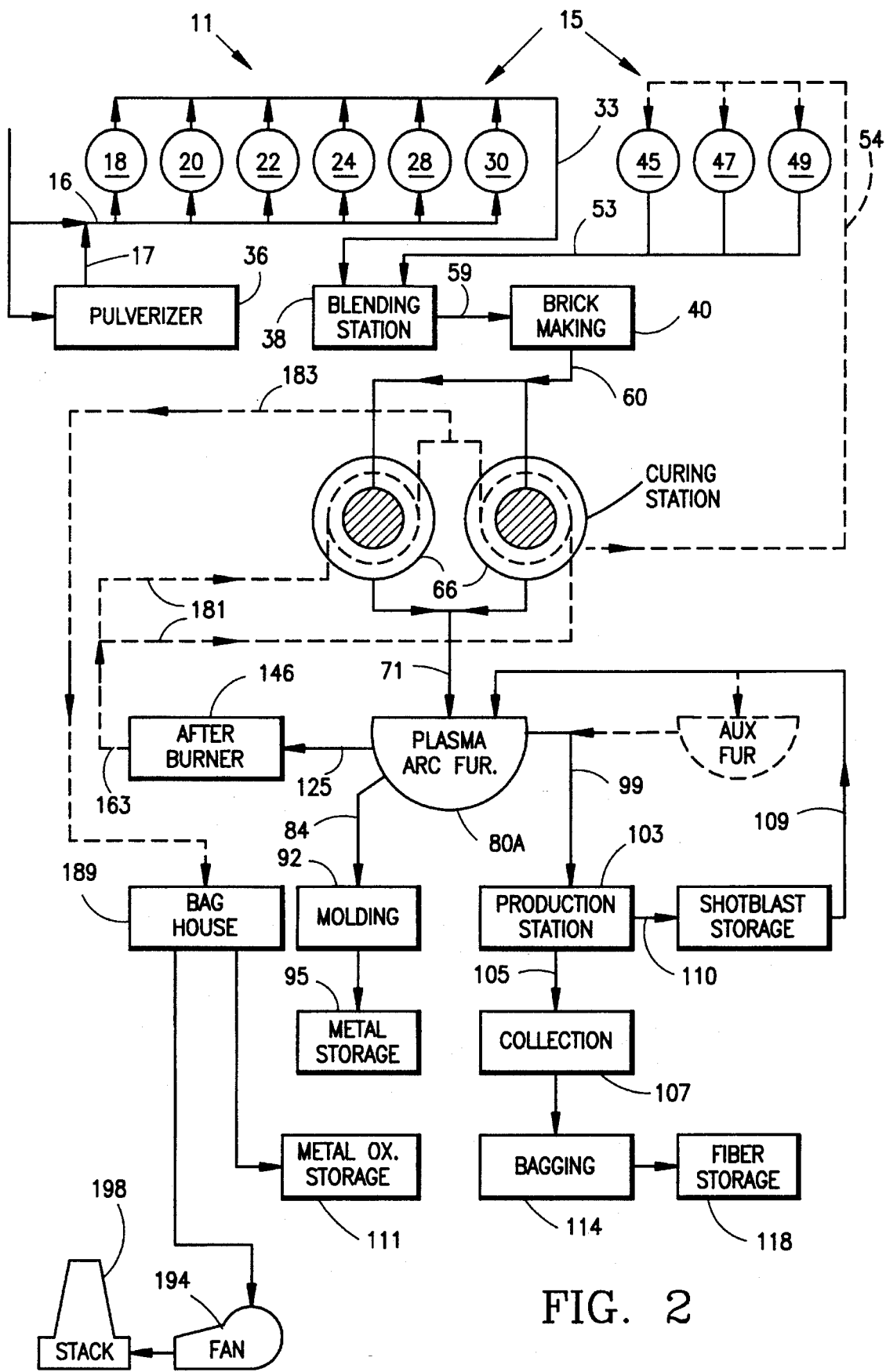
FIG. 2 shows a block diagram of the process of the present invention wherein a plasma arc furnace is employed.

Numerous types of existing waste treatment apparatus may be used in the process of the present invention. Referring to the drawings, FIG. 1 illustrates process 10 which utilizes a coke-fired shaft furnace. In FIG. 2, the process 11 utilizes a plasma arc furnace and thus emphasizes the use of electricity rather than the burning of carbon. System 11 is preferred where limitations on carbon monoxide emissions are severe. However, it is to be understood that the process of the present invention can be carried out in any applicable furnace regardless of heat source, including, for example, gas, electric, oil, coal and coke fired units. The primary difference in each operation is the size of the particles. It is preferred that the upper size limit for the particle be about one and one-half (1½) to about two (2) inches in diameter in order to ensure a quick drying briquette. This size is ideal for use in shaft furnaces such as a cupola. Micro pellets, having an average size diameter of about one-half inch, are more suitable for use in an electric arc furnace. In either process, higher temperature metals alloy with iron and/or nickel (which have lower melting temperatures), thereby allowing a lower temperature furnace to be used to extract high temperature metals.

With reference to FIGS. 1 and 2, waste products are collected from various sources and stored in facility 15 which collectively comprises solid waste silos and liquid waste silos. More specifically, solid and semi-solid waste materials are stored in solid waste silos 18, 20, 22, 24, 28 and 30, while liquid waste materials, such as waste waters, are stored in liquid waste silos 45, 47 and 49. It is to be understood that the number of solid and liquid waste silos is immaterial to practicing the present process and any number of silos may be employed. Further, the solid and liquid waste silos also may be used to store other components to be blended with the waste material, such as non-waste components derived from commercial sources, including, for example, carbon and aluminum reducing agents and primary fluxing agents, binders, secondary fluxing agents and the like, as well as water.

Dry solids having a particle size of 100 mesh or less, such as EPA designated waste K061 (dry dust), are charged directly to storage silos 18, 20, 22, 24, 28, and 30. Solids or semi-solids that require size reduction are conveyed to pulverizer 36 via line 16 which broadly denotes a variety of conventional bulk material processing apparatus and thereafter conveyed to the silos as indicated by line 17. For example, waste materials such as EPA designated waste K088 (first cut) may be pulverized to powder before storage in the silo facility 15.

Pre-selected waste materials and selected other components are delivered from the storage facility 15 by means of conveyor 33 to blending station 38. The waste material is weighed and blended with predetermined amounts of liquids stored in the liquid storage silos 45, 47 and 49, including for example, certain metal-bearing liquid wastes, such as EPA designated wastes K062, P021, P029, P030, P074, P104 P106, P121, F007, F009, F011 or water-soluble oils. Preferably, water is added to the blend. Liquid or semi-liquid substances are delivered via pipe 53 into blending station 38, mixed with the waste materials from line 33, thereby forming a homogenous, semi-solid mass. The resulting mass is conveyed to brick making station 40 via line 59 and shaped into particles of predetermined shapes and sizes in station 40. These predetermined shapes and sizes may hereinafter be referred to simply as "particles". However, it is to be understood that the term "particle" broadly encompasses both briquettes and pellets having a particle size of from about 1/16 to about 4 inches. Accordingly, station 40 may provide either briquette-making or pelletizing of the waste material, depending on the desired size and shape of the particle.

Several methods may be employed to form the particles from the homogenous semi-solid mass. When the starting waste materials include sludges or other high moisture materials, the materials are weighed and placed into a mixer. The resulting mixture is blended into a mass which resembles pottery clay. This homogenous mass is formed into briquettes by extrusion or roll briquetting. When the starting waste materials are dry, the materials may be pre-weighed and mixed, or they simple may be metered onto a pelletizing disk or pan. Liquid is sprayed onto the dry material to be pelletized along with binders when necessary. The individual particles pick up or are coated by the liquid and the particles start to agglomerate. The agglomerate is held together by surface tension between the particles. The particles roll down the slope of the pelletizing disk picking up more particles. Gravity causes compaction as the agglomerate becomes larger. This results in an uncured pellet, commonly referred to as greenfeed, that is held together by capillary pressure.

The size of the pellet or briquette depends on the type of furnace to be utilized. Where an arc furnace or certain types of gas fired reverberatory furnaces are used, a micro pellet of less than one-half inch has proven successful. Other types of furnaces, such as shaft types, may use the larger size pellets or briquettes. The size of the pellets or briquettes may range from about 1/16 to about 4.0 inches in diameter and preferably are about 1½ inches in diameter. When the size becomes much larger than 1½ inches mean diameter, the drying time of the pellet or briquette is extended greatly. Essentially, the briquetted material is formulated to melt at between about 2,200° and about 2,600° F. such that the resulting slag will remain liquid from about 2,200° to 1,700° F., thereby allowing standard mineral wool to be produced.

Referring to FIG. 1, the brick-making machine 40 extrudes or otherwise forms the shapes the homogenous semi-solid mass into briquettes of a predetermined size suitable for the selected melting apparatus. Preferably, the briquettes have a nominal size of about 1.0 to about 2.0 inches, and more preferably, the briquettes have a nominal size of about 1½ inches. The particles thus formed are stabilized under ambient conditions prior to handling. Stabilization time is dependent on the size of the material, the moisture content of the particles and the binders utilized in the formulation. Typically, the particles are stabilized for a period of from about 10 minutes to about three hours. The stabilized particles are conveyed from the station 40 via line 60 into a curing station 66.

The curing station 66 is operated at a temperature of from about 170° to about 220° F. during the curing stage. As indicated by line 155, the curing station utilizes steam generated from the waste heat boiler 151. In this manner, heat generated from the instant process is recycled back to curing station 60. The briquettes are cured in an atmosphere of high humidity. Curing and drying time necessarily is dependent on the size and composition of the briquette. Larger briquettes and briquettes having a higher moisture content require longer periods of drying time. The briquettes are dried to a moisture content of less than about 10.0%, preferably less than about 6.0%. Water extracted from the particles during the drying step is recycled to the liquid silos via broken line 54. Although the curing and drying operation can be accomplished by a heat source other than the furnace, many furnaces that can be used in this process produce waste heat in the exhaust air stream.

In process 10, the cured and dried briquettes are transferred from curing station 66 by skip cart or conveyor 71. Coke or similar fuel retained in storage bin 76 is conveyed together with the cured bricks to a cupola 80 or similar coke-fired shaft furnace. Preferably, the process of the present invention utilizes a cupola which allows large briquettes to be used. However, the process may also employ other types of furnaces, such as electric arc, plasma arc or reverboratory furnaces. Where the latter furnaces are employed, the feed material can be reduced in size. The cupola can be fitted with a plasma torch to eliminate or reduce the consumption of coke.

The cupola 80, charged with the fuel (i.e. coke) and dried briquettes slowly is heated to a temperature of from about 1,660° to about 3,100° F., preferably from about 2,750° to 3,000° F. and more preferably from about 2,750° to about 2,850° F. During the heating stage, the carbon (as well as the aluminum when present) in the briquettes creates a reducing atmosphere within the structure of the briquettes. Gases from coke combustion heat the charge material as they move up the shaft. Moisture in the briquettes, for example, in the form of hydroxides, as well as carbonates, are removed as the charge material preheats from the hot gases. This process of calcination starts on the surface of the feed material at about 1,300° F. The calcination of a 1.5 inch diameter piece of charge material is complete in its center by the time the surface temperature of the charge reaches about 2,100° F.

Since the feed material, whether in pellet or briquette form, contains carbon, a reaction occurs between the various metal oxides of the waste material and the carbon, thereby reducing certain metals to their metallic states before the charge melts. At 1,800° F., the finely divided particles of carbon in the charge material will remove oxygen from metals that are the closest thereto. This process takes place first on the charge (i.e. briquette) surface and moves into the charge as the center heats. The charge must not melt until the reduction is complete. When the center of the charge reaches 2,400° F., the benchmark metal, i.e. iron, will be fully reduced within fifteen minutes. The reaction in the center of the charge is as follows:

$$Fe_2O_3 + 2C \rightarrow 2Fe + CO + CO_2$$

On the surface of the charge the more likely reaction is:

$$Fe_2O_3 + 3C \rightarrow 2Fe + 3CO$$

Iron is chosen as the benchmark metal because it goes through many changes in oxide phases. Both carbon and the resulting carbon monoxide will reduce $Fe_2O_3$ to $Fe+$ (i.e., pure metallurgical elemental iron) at a rate of 99%+ in fifteen minutes at 2,400° F. This benchmark is very important. Gold, silver, zinc, lead, copper, nickel and tin are reduced before the FeO in the charge material is reduced. Because no reduction occurs in the slag, it is important that $Fe_2O_3$ is reduced to Fe+ before the charge material melts. When carbon reduces a metal, the carbon is converted carbon monoxide (CO). As the CO gas escapes the charge, it contacts reducible metal oxides and reduces the metal to form $CO_2$. If the $CO_2$ contacts other carbon particles it will form two CO molecules that can remove two more molecules of oxygen from the metal oxides in the charge, thereby forming $CO_2$ again; or, the $CO_2$ may escape the charge material into the furnace atmosphere.

When large amounts of chromium oxides are present, aluminum is added into the pellet or briquette along with carbon. Chromium can be reduced by carbon and carbon monoxide but the mean result is a forty-five percent reduction efficiency. Consequently, a high percentage of the chromium is tapped from the furnace in carbide form or is incorporated into the slag. This result is due to the fact that chromium oxide is being reduced at approximately the same temperature that the cured feed material is starting to melt. The addition of aluminum in the charge material causes a modified thermite process. Thus, two mole pounds of aluminum will remove the oxygen from two mole pounds chromium oxide if the chromium is in the following form:

$$Cr_2O_3 2Al - 2,000° F. \rightarrow 2Cr + Al_2O_3$$

This process also can increase the temperature at the point of the formation of alumina to +5,000° F. The iron that is in the charge material forms an alloy with the chromium to make a cuteeric alloy with a lower melting point.

Reducible metals such as copper, chromium, iron, and nickel or alloys may be drawn off the molten mixture in the cupola 80 via the lower tap 84, that is preferably coupled to a mold 92. In the mold 92, reducible metals are shaped and cooled. The molded metals may be transferred after cooling to suitable storage 95 for sale.

Based upon recent experimentation, substantial purity is obtained in the recovered reducible metals (i.e. tapped off from the furnace). For example, treated sludges containing oxides or hydroxides of nickel and iron only will reduce virtually quantitatively to a ferro-nickel alloy. Copper-rich sludges may be reduced to copper metal of ninety-nine percent (99%) purity. From oxide mixtures containing iron, nickel and chromium, 99% of iron, 98% of nickel, and approximately 85% of chromium may be recovered as an alloy.

The volatile metals, such as zinc, lead and cadmium, are volatilized in the presence of carbon. Carbon and carbon monoxide removes the oxygen from the zinc oxides in much the same manner as the they remove the oxygen from other reducible metals. Zinc oxide will reduce easily within the charge material but zinc oxide's reduction temperature is 2,000–2,200° F., well above the volatilization point of zinc metal (1,665° F.) Consequently, zinc metal will fume out of the charge material at a temperature of about 1,665° F. and higher.

Cadmium oxide will volatilize before reduction, generally at a sublimation temperature of from about 1652° to 1832° F. and escape from the charge material into the furnace atmosphere. Zinc and cadmium oxide are captured from the exhaust air stream. Lead oxide will also fume when the lead is not reduced, staging at a temperature of about 1,700° F. and, if not captured in the slag, will be very volatile at about 2,700° F. If the lead is reduced, it can be tapped from the furnace in the same manner as iron, nickel, copper, etc. When iron or iron alloy is the main reducible metal, the lead, much like copper, will not stay in the iron, but will separate into a layer (either in the furnace or mold) that can be removed when the pig is cooled and removed from the mold. When the furnace is tapped intermittently, the lead will come off the furnace first before the iron or iron alloys, making it easier to separate as a secondary metal.

Many wastes contain chlorides and/or fluorides that make the capture of these volatile metals in their pure form difficult. When halogens are present (fluorides and chlorides), both lead and zinc start to volatilize at a lower temperature of about 1,400° F. for zinc chlorides and about 1,450° F. for lead chloride. When enough halogens are present the lead will fume before the best reduction point for lead oxide (1,800° F.). The metals are reduced and/or volatilized before the charge material starts to melt. The charge material starts to melt at a temperature of from about 2,400° to about 2,600° F.

Accordingly, lead which has been reduced is tapped from the furnace as a secondary alloy and is separated from iron into two distinct layers in the furnace or mold. When halogens are present (i.e., chlorides or fluorides) lead will volatilize before reduction, and is captured like zinc or cadmium.

The volatile metals and other exhaust products are directed out of cupola 80 via exhaust ports 125. In process 10, port 125 feeds into a heavy solids separator 133. A fine water mist is injected into the separator 133 in order to separate out particles larger than about ten microns (10) from the exhaust products. These larger particles are transferred from separator 133 via conveyor 135 into recycling station 140 for conveyance to the pulverizer 36. Once pulverized, the resulting ground particles are recombined with other waste mixtures from storage facility 15 for further processing.

Solid particles less than 10 microns in diameter and exhaust gases remaining after processing in separator 133 are conveyed to afterburner 146. In the afterburner, these particles and exhaust gases, including, for example, carbon, carbon monoxide and other combustibles, are mixed with air and natural gas and ignited. The mixed gas stream is oxidized in the afterburner 146 to convert CO to $Co_2$, Zn to ZnO, Pb to PbO, etc. This oxidation enables a standard air pollution device to be used to remove the metal oxides from the air stream.

Hot burning gases pass into a waste heat boiler 151 which produces steam. As indicated by broken line 155, the steam is piped out of boiler 151 and used to power the briquette curing and drying station 66 and the mineral wool production station 103. The cooled exhaust gases from boiler 151 are directed via pipe 163 into a heat exchanger 167. The gases release heat which is used to heat outside air which is fed to exchanger 167 via blower 174. As indicated by broken line 177, air preheated by the exhaust gases is piped into of cupola 80. Cooler gases subsequently are directed via duct 183 into a baghouse 189. In this manner, energy produced from the combustion of the exhaust stream of the furnace is completely recycled and can be used to make steam for fiberizing molten slag, for preheating of the furnace blast air and/or for drying or curing charge materials.

In baghouse 189, the reduced-temperature gases are treated to separate solids from exhaust gases. Recovered solids, generally comprising marketable oxides from the volatilized zinc, cadmium, and lead, are stored at 111. The exhaust gases, now purified of offensive and hazardous components, are drawn upwardly by a fan 194 through stack 198 and may be exhausted into the environment or compressed for carbon dioxide production.

After the reducible metals are separated and removed from the molten mixture, a molten slag remains in cupola 80. The slag, devoid of volatile metals such as cadmium, lead, zinc, comprises various non-reducible metal oxides, including, for example, the oxides of aluminum, chromium, titanium, silicon, zirconium, and calcium. The molten slag is drawn off via the upper tap 99 of the furnace 80 for subsequent use in mineral wool production.

The molten slag has a melting point lower than any single element of the mixture. When the charge is properly formulated, the slag formed from $CaO$, $Al_2O_3$ and $SiO_2$ and other non-reducible metal oxides will remain liquid or remelt at a temperature of from about 1,600° to about 1,800° F. This melting point is far below the melting points of the non-reducible metal oxides which are: 3,133° F. for $SiO_2$, 3,672° F. for $Al_2O_3$ and 4,737° F. for CaO. When the temperature of the molten slag is increased to about 2,600° F., these non-reducible metal oxides will not melt as pure materials, but will start to blend and flow together whereby their surfaces touch to form a eutectic slag or flux.

The viscosity of the slag can be modified by the presence of secondary fluxing agents, such as sodium and fluoride, at less than five percent of the slag weight. These secondary fluxes also are found in waste materials in usable forms. As discussed above, secondary fluxes primarily are used to keep the furnace walls and/or coke clean by changing the viscosity of the slag in most furnace operations. The slag resulting from the melting of $CaO$, $SiO_2$ and $Al_2O_3$ removes sulphur and protects the metals being produced from reoxidizing in the firing zone of the furnace. When the slag is formulated properly, the slag may be spun into fiber. The alumina in the slag is referred to as a modifier. Other useful modifiers for slags include, for example, titanium dioxide, zirconium dioxide and chromium oxide.

From tap 99 the molten slag comprising the non-reducible metal oxides may be blown or spun into mineral wool at production station 103. Any trace amounts of heavy metals in said slag are tightly bound into the calcium-alumina-silicate matrix. Testing has shown that the slower a vitreous material cools, the more crystalline the material becomes and the easier it is to extract trace heavy metals with water. This is because the slag matrix can exclude the metals that do not fit the silicate bonds perfectly. When broken, the vitreous material will break along the points where the bond is weakest, between the crystal planes, that arc also the points where heavy metals are present.

Quick cooling of a vitreous material avoids the crystalline state. The faster the cooling, the closer the slag comes to being truly amorphous, with heavy metals included into the calcium-alumina-silicate matrix. In the mineral wool production station 103 vitreous fiber strands are formed and cooled in less than ten milliseconds.

The mineral wool produced at station 103 is fed via conveyor 105 into collection bins 107, and subsequently separated and packaged for sale in bagging machine 114. Alternatively, impure material can be recycled to station 140. After bagging, the mineral wool is retained in storage 118 for sale. Not all of the molten slag is spun into vitreous fiber. Approximately one-third of the slag is formed into unspun particles, commonly referred to as shot. The shot may be recycled from production station 103 via conveyor 109 into the recycling station 140 for rebriquetting or pelletizing the shot with the fresh feed into greenfeed. The shot is considered an inert in the formulation because it is formulated properly for wool production and contains no metals to be reduced. In an alternate embodiment, the shot can be screened, bagged and stored as shot blast material at station 110 for future sale. The shot produced by this process typically lasts three times longer than sand when used in a sand blast unit before breaking apart.

FIG. 2 shows a second embodiment of the present invention which utilizes a plasma arc furnace rather than a coke-fired shaft furnace. It is to be understood that a submerged arc furnace also could be utilized in the same manner. Although the basic recycling process remains the same regardless of the type of furnace used to melt the pellets, there are some differences to be noted.

The curing technique of process 11 shown in FIG. 2 is different. In process 11, once the briquettes or pellets have been formed, they are conveyed to curing station 66A. The freshly made pellets or briquettes are placed into storage that can hold up to eight hours of furnace feed per silo. The heat from the furnace exhaust heats the outside of the silo. As heating progresses, the feed on the bottom of the silo becomes dry, providing the warm moisture at the top of the silo, thereby promoting curing. In this manner, the pellets or briquettes are cured, dried and stored in one unit. In this system, the curing station involves the direct recirculation of exhaust gases as indicated by lines 181 and 183 in FIG. 2. It is to be understood that the pelletizing, curing and drying systems shown in FIG. 2 may be used in place of, or in combination with, the waste heat boiler operation illustrated in FIG. 1.

After curing and drying, the resulting briquettes or pellets are transported to plasma arc furnace 80A by conveyor 71. The electric arc in plasma arc furnace 80A heats the charge in the same manner when operated in the "cold top" mode. As the charge material toward the bottom of the furnace melts, the charge material at the top moves down toward the melting zone. As the charge moves down, the heat of the furnace gases increases, forcing a reaction within each piece of charge material. Furnace 80A has little heat value in the exhaust gases. From furnace 80A the exhaust, comprising volatilized metals and exhaust product and having little or no large particles, is directed to the afterburner 146 via duct 125. In contrast with process 10, port 125 in process 11 preferably has no heavy solids separator. The hot gas stream from the afterburner 146 is directed between the two walls of the curing station 66 via ducts 181. The heat in the gas stream heats the briquettes or pellets through the curing station shell. Briquettes or pellet transferred into the top of the curling station 66 are cured by the steam from the briquettes on the bottom, which are dried by exhaust gasses from duct 181. The curing station also serves as the storage silo for the furnace 80A. The exhaust gases 181, thus cooled via heat transfer at the curing stations 66, are directed to the baghouse 189 via duct 183.

As in process 10, reducible metals are drawn off the molten mixture via lower tap 84 and are transferred to molding station 92 while the molten slag, devoid of volatile metal oxides, is transported to mineral wool production station 103. In process 11, the shot can be placed into another smaller furnace, such as the auxiliary furnace shown if FIG. 2, that does not waste energy. This furnace may be a semi-submerged arc furnace. The shot is heated until liquid. The resultant liquid slag will conduct current, but with high resistance. The resistance of the slag heats the slag and the liquid slag melts more shot. The liquid slag is tapped at 99 and transported to production station 103 where it is spun into fiber. Alternatively, the resulting shot is returned to the furnace via line 109.

Accordingly, methods 10 and 11 thus provide complete recycling of industrial waste materials to produce commercially marketable products with minimal resulting waste. Complete reclamation of hazardous and/or valuable substances by the present process permits industry to minimize waste, fully exploit its available resources, and expand its markets.

As described in the following examples, reducible metals may be reclaimed as pure metals or alloys, and volatile metals may be reclaimed as concentrated oxides.

EXAMPLE I: Recovery of Zinc and Iron and Production of Mineral Wool

The waste materials listed in Table 6 below were mixed with 30 %/wt. of first cut SPL (EPA designated waste K088 shown in Table 4) and 2½%/wt. of sugar, into a homogeneous mass. The mass was molded into pellets having an average mean diameter of 1¼ inches and the resulting pellets were stabilized for a period of 2 hours under ambient conditions. The stabilized pellets were charged to a curing/drying oven having an initial temperature of 80° F. which was gradually increased to 170° F. over a 12 hour period. The temperature of the curing/drying oven then was raised to 210° F. as water was extracted from the air stream. After five hours, the temperature was regulated between 220° and 240° F. for the next seven hours. The dried pellets had a final moisture content of less than 5%/ wt. The oven was turned off for a period of three hours before the dried particles and were charged to a shaft furnace having an initial temperature of 800° F. The temperature of the furnace was gradually increased to 2800° F. thereby reducing the pellets. Water condensed from the drying operation was tested for cyanide and none was detected; the condensed water was recycled to a binder premix tank.

TABLE 6

Waste Materials Used In Sample

| Waste Source | Sub-components* | Percents of Total | Subtotal |
|---|---|---|---|
| EPA Designated Waste K061 | | | 63.1% |
| | CaO | 25.0% | |
| | Fe$_2$O$_3$ as Fe | 24.0% | |
| | ZnO as Zn | 22.0% | |
| | SiO$_2$ | 3.0% | |
| | MgO | 3.0% | |
| | PbO as Pb | 1.0% | |
| | Cr$_2$O$_3$ as Cr | 1.07% | |
| | CdO as Cd | 0.065% | |
| EPA K062 (stabilized secure land fill material) | | | 19.42% |
| | CaO | 41.2% | |
| | SiO$_2$ | 13.1% | |
| | Organics | 4.61% | |
| | Fe$_2$O$_3$ as Fe | 4.47% | |
| | Al$_2$O$_3$ as Al | 1.7% | |
| | Zn | 0.0197% | |
| | Ba | 0.00567% | |
| | Cu | 0.00549% | |
| | Pb | 0.00514% | |
| | Cr | 0.00375% | |
| | Ni | 0.00225% | |
| | As | 0.000792% | |
| | Hg | 0.000201% | |
| | Cd | 0.000171% | |
| EPA Designated Waste F019 | | | 9.71% |
| | Al(OH)$_3$ | 74.0% | |
| | Ca(OH)$_2$ | 15.0% | |
| | Mg(OH)$_2$ | 10.4% | |
| New Silica Sand | | | 7.77% |
| | SiO$_2$ | 98.0% | |
| Approximate total | | | 100.00% |

*subcomponents are given by dry weight at 101° C.

A typical sample of products resulting from one ton of dried briquettes is shown in Table 7. The molten slag had an Acid:Base ratio of 0.92 and a basicity of 1.11. No waste resulted from the process as all exhausts, heavy solids, and shot were recycled into the system. Lead present as a secondary alloy readily separated in the molds and after cooling.

TABLE 7

Yield From One Ton Sample

| Product | Sub-Components | Yield in Pounds |
|---|---|---|
| Primary Alloy | | 315.67 |
| | Fe | 314.45 |
| | Cr | 0.63 |
| | S | 0.56 |
| | Cu | 0.02 |
| | Ni | 0.01 |
| Volatile Metals | | 250.84 |
| | Zn | 249.94 |
| | Pb | 0.78 |
| | Cd | 0.12 |
| Secondary Alloy (Pb) | | 12.32 |
| Slag (Oxides) | | 1,116.92 |
| | Ca | 504.65 |
| | Si | 356.28 |
| | Al | 152.16 |
| | Mg | 57.55 |
| | Fe | 16.77 |
| | S | 12.11 |
| | F | 9.84 |
| | Na | 6.15 |
| | Chlorides | 0.80 |
| | Pb | 0.32 |
| | Cr | 0.27 |
| Mineral wool from slag | | 838.00 |
| Shot | | 279.00 |

EXAMPLE II: Recovery of Iron and Zinc and Production of Mineral Wool

The waste materials listed in Table 8 below were mixed with 3.5% wt. of fresh carbon and 10% wt. first cut SPL as carbon reducing agents, and molasses as a binder, into a homogeneous mass. The mass was molded into pellets having an average mean diameter of ¾ inch. The resulting pellets were stabilized for a period of 1 hour under ambient conditions. The stabilized pellets were charged to a curing/drying oven having an initial temperature of 100° F. and the temperature was gradually increased to 170° F. over an 8 hour period. The temperature of the oven was raised to 200° F. as water was extracted from the air stream. After ten hours, the temperature was regulated between 230° and 240° F. for the next four hours. The temperature was lowered to 100° F. for 32 hours. The dried particles had a final moisture content of less than 5% wt. The particle then were charged to a shaft furnace having an initial temperature of 800° F. The temperature of the furnace was gradually increased to 2900° F. thereby reducing the pellets. Water condensed from the drying operation was tested for cyanide and none was detected; the condensed water was recycled to a binder premix tank.

TABLE 8

Waste Materials Used In Sample

| EPA Designation | Components | Percent of Total |
|---|---|---|
| K061 | | 70% |
| | CaO | 25% |
| | Fe$_2$O$_3$ as Fe | 24% |
| | ZnO as Zn | 22% |
| | SiO$_2$ | 3.0% |
| | MgO | 3.0% |
| | PbO as Pb | 1% |
| | Cr$_2$O$_3$ as Cr | 0.07% |
| | CdO as Cd | 0.065% |
| Molding sand | | 10% |
| | SiO$_2$ | 93% |
| | Organic Binders | 3% |
| | Al$_2$O$_3$ | 2% |
| | Al | 1.66% |
| Grinding/Buffing Sludge | | 20% |
| | Al | 41% |
| | Fibers | 33% |
| | SiO$_2$ | 20% |
| Approximate total: | | 100.00% |

*Components are given by dry weight as measured at 101° C.

A typical sample of products resulting from one ton of dried briquettes is shown in Table 9. The molten slag had an Acid:Base ratio of 1.33 and a basicity of 0.78. Fuel consumption was reduced by roughly one-half, due to the presence of aluminum in the waste. The aluminum contained in the casting sands and the sludge from the grinding and buffing operations assisted in the reduction of the iron and zinc in the waste materials while increasing the slag temperature and volatilizing the zinc. Heavy solids from the furnace exhaust and shot from the fiberizing operation were recycled with no resulting waste. Lead present as a secondary alloy readily separated in the molds and after cooling.

TABLE 9

Yield From One-Ton Sample

| Product | Subcomponents | | Pounds |
|---|---|---|---|
| Primary Alloy | | | 336.86 |
| | Fe | 336.0 | |
| | Cr | 0.086 | |
| Volatile Metals | | | 278.14 |
| | Zn | 277.2 | |
| | Cd | 0.86 | |
| | Pb | 0.08 | |
| Secondary Alloy: Pb | | | 13.65 |
| Slag (Oxides) | | | 948.61 |
| | Si | 361.73 | |
| | Ca | 350.00 | |
| | Al | 143.91 | |
| | Mg | 42.0 | |
| | Fe | 17.92 | |
| | F | 10.92 | |
| | S | 8.09 | |
| | Na | 6.83 | |
| | Inerts | 5.85 | |
| | Chloride | 0.89 | |
| | Pb | 0.35 | |
| | Cr | 0.12 | |
| Mineral Wool from slag | | | 71.00 |
| Shot | | | 237.00 |
| Approximate subtotal: | | | 948.00 |

EXAMPLE III: Recover of Chrome, Zinc, Nickel and Iron Alloy and Production of Mineral Wool The waste materials listed in Table 10 below were mixed with 10% wt. first cut SPL as a carbon reducing agent, and 2½% wt. of a mixture of sugar and starch, into a homogeneous mass. The mass was molded into pellets having an average mean diameter of 1½ inch. The resulting pellets were stabilized for a period of 3 hours under ambient conditions. The stabilized pellets were charged to a curing/drying oven having an initial temperature of 80° F. and the temperature was gradually increased to 170° F. over a 12 hour period. The temperature was raised to 210° F. as water was extracted from the air stream. After four hours, the temperature began to rise and had to be regulated to between 220° and 240° F. for the next 24 hours. The particles were dried to a final moisture content of less than 5% wt. Heat was removed from the oven two days before the dried particles were charged to a shaft furnace having an initial temperature of 650° F. The temperature of the furnace was gradually increased to 3100° F. thereby reducing the pellets. Water condensed from the drying operation was tested for cyanide and none was detected; the condensed water was recycled to a binder premix tank.

TABLE 10

Waste Materials Used In Sample

| EPA Designation | Components* | Percent of charge | |
|---|---|---|---|
| EPA Designated Waste K061 | | | 44.0% |
| | CaO | 25.0% | |
| | $Fe_2O_3$ as Fe | 24.0% | |
| | ZnO as Zn | 22.0% | |

TABLE 10-continued

Waste Materials Used In Sample

| EPA Designation | Components* | Percent of charge | |
|---|---|---|---|
| | $SiO_2$ | 3.0% | |
| | MgO | 3.0% | |
| | PbO as Pb | 1.0% | |
| | $Cr_2O_3$ as Cr | 0.07% | |
| | CdO as Cd | 0.065% | |
| F006 | | | 34.0% |
| | Cr | 24.662% | |
| | Ni | 15.559% | |
| | Organics | 0.9% | |
| | Fe | 8.44% | |
| | CaO | 1.88% | |
| | Zn | 1.193% | |
| | Cu | 0.71% | |
| | Mg | 0.6% | |
| | Pb | 0.065% | |
| EPA Designated Waste F019 | | | 6.5% |
| | $Al(OH)_3$ | 74.0% | |
| | $Ca(OH)_2$ | 15.0% | |
| | $Mg(OH)_2$ | 10.4% | |
| EPA Waste K062 (stabilized secure land fill material) | | | 15.5% |
| | CaO | 14.2% | |
| | $SiO_2$ | 13.1% | |
| | Organics | 4.61% | |
| | $Fe_2O_3$ as Fe | 4.47% | |
| | $Al_2O_3$ as Al | 1.7% | |
| | Zn | 0.0197% | |
| | Ni | 0.00225% | |
| | Ba | 0.00567% | |
| | As | 0.000792% | |
| | Cu | 0.000201% | |
| | Hg | 0.000201% | |
| | Pb | 0.00514% | |
| | Cd | 0.000171% | |
| | Cr | 0.00375% | |

*Components are given by dry weight as measured at 101° C.

A typical sample of products resulting from one ton of dried briquettes is shown in Table 11. The molten slag had an Acid:Base ratio of 0.92 and a basicity of 1.11. Heavy solids from the furnace exhausts and shot from the fiberizing operation were recycled with no resulting waste. Lead present as a secondary alloy readily separated in the molds and after cooling.

TABLE 11

Yield From One-Ton Sample (pounds)

| Products | Subcomponents | | Pounds |
|---|---|---|---|
| Primary Alloy | | | 458.19 |
| | Fe | 252.67 | |
| | Cr | 107.26 | |
| | Ni | 94.06 | |
| | Cu | 4.2 | |
| Volatile Metals | | | 165.616 |
| | Zn | 165.11 | |
| | Cd | 0.50 | |
| | Pb | 0.006 | |
| Secondary Alloy: Pb | | | 7.98 |
| Slag (Oxides) | | | 847.68 |
| | Ca | 345.02 | |
| | Si | 290.82 | |
| | Al | 94.73 | |
| | Cr | 45.97 | |
| | Mg | 39.89 | |
| | Fe | 13.48 | |
| | S | 6.92 | |
| | F | 6.24 | |
| | Na | 3.9 | |
| | Cl | 0.51 | |

TABLE 11-continued

Yield From One-Ton Sample (pounds)

| Products | Subcomponents | Pounds |
|---|---|---|
| | Pb | 0.20 |
| Mineral Wool from Slag | | 636.00 |
| Shot | | 211.00 |
| Approximate subtotal: | | 847.00 |

EXAMPLE IV. Recover of Cu and Production of Mineral Wool

The waste materials listed in Table 12 were mixed with 3% wt. of pre-hydrated starch and molded into briquettes having an average mean diameter of 2 inches. Carbon was derived from both the air emission dust and from the fibers in the grinding/buffing sludge. Aluminum also was derived from the grinding/buffing sludge. The briquettes were stabilized for a period of twenty four hours prior to being charged to an electric infrared heater. The charged material remained in the heater for a period of 24 hours; the top material in the heater was 480° F. and the bottom material was 250° F. The resultant dried particles had a final moisture content of 6.0%. The dried particles were placed in a 55 gallon drum with coke at a 6:1 ratio for 20 hours. The combined material from the drum was charged to a shaft furnace having an initial temperature of 850° F. The temperature of the furnace was gradually increased to 3100° F. thereby reducing the pellets.

TABLE 12

Waste Materials Used In Sample

| EPA Designation | Components* | Percent of Total |
|---|---|---|
| EPA Designated Waste F006 | | 60.0% |
| | Cu | 30.01% |
| | CaO | 23.0% |
| | Zn | 4.2% |
| | Cr | 0.0036% |
| | Ni | 0.0036% |
| | Ba | 0.0008 |
| | As | 0.006% |
| MOLDING SAND | | 10.0% |
| | $SiO_2$ | 93.0% |
| | Organic Binders | 3.0% |
| | $Al_2O_3$ | 2.0% |
| | Al | 1.66% |
| AIR EMISSION DUST | | 20.0% |
| | C | 50.0% |
| | CaO | 21.0% |
| | $Al_2O_3$ | 10.0% |
| | $SiO_2$ | 6.0% |
| | MgO | 3.1% |
| | Fluorides | 0.3% |
| GRINDING/BUFFING SLUDGE | | 10.0% |
| | Al | 41.0% |
| | Fibers (carbonized) | 33.0% |
| | $SiO_2$ | 20.0% |

*Components are given by dry weight as measured at 101° C.

A typical sample of products resulting from one ton of dried briquettes is shown in Table 13. The molten slag had an Acid:Base ratio of 1.11 and a basicity of 0.96. Heavy solids from the furnace exhausts and shot from the fiberizing operation were recycled with no resulting waste.

TABLE 13

Yield From One-Ton Sample

| Product | Subcomponents | | Pounds |
|---|---|---|---|
| Primary Alloy | | | 342.08 |
| | Cu | 342.0 | |
| | Ni | 0.04 | |
| | Cr | 0.03 | |
| | As | 0.01 | |
| Volatile Metals: Zn | | | 45.36 |
| Secondary Alloy | | | None |
| Slags from Oxides | | | 790.25 |
| | Ca | 360.00 | |
| | Si | 274.46 | |
| | Al | 114.17 | |
| | Inerts | 25.35 | |
| | Mg | 12.40 | |
| | S | 2.68 | |
| | F | 1.17 | |
| | Ba | 0.01 | |
| | Cr | 0.01 | |
| Mineral Wool from Slag | | | 592 |
| Shot | | | 197 |

While particular embodiments of the invention have been described, it will be understood, of course, that the invention is not limited thereto, and that many obvious modifications and variations can be made, and that such modifications and variations are intended to fall within the scope of the appended claims.

What is claimed is:

1. A process for recycling industrial waste materials comprising:
   a) blending (1) one or more industrial waste materials comprising at least one component selected from the group consisting of reducible metals, volatile metals and nonreducible metal oxides, (2) at least one carbonaceous reducing agent and (3) at least one primary fluxing agent, into a homogenous mass;
   b) forming and shaping said homogenous mass into particles having an average mean diameter not greater than four inches;
   c) curing and drying said particles at a temperature of from about 170° to 240° F. for a period of time such that the resulting particles have a moisture content of less than about 10.0%;
   d) heating and melting the resulting particles at a temperature of from about 1,660° to about 3,100° F. such that a reducing atmosphere is created within the structure of the particles from the release of said reducing agent, thereby forming (1) reducible metals, (2) volatile metals (3) a molten slag comprising non-reducible metal oxides and (4) exhaust products; and
   e) separating and recovering at least one component selected from the group consisting of (1) reducible metals, (2) volatile metals, (3) exhaust products, and (4) a molten slag comprising non-reducible metal oxides, resulting from said heating and melting step (d).

2. The process according to claim 1, further comprising molding the reducible metals.

3. The process according to claim 1, wherein said molten slag comprises calcium oxide, silicon dioxide and alumina.

4. The process according to claim 1, further comprising forming vitreous fiber and shot from said molten slag.

5. The process according to claim 4, wherein said resulting shot is recycled for use in the starting blend of waste materials.

6. The process according to claim 1, wherein said volatile metals and exhaust products are in the form of solid particles and wherein said exhaust products comprise at least one component selected from the group consisting of carbon and carbon monoxide.

7. The process according to claim 6, further comprising:
(a) introducing the volatile metals and exhaust products in the form of solid particles to a heavy metal separator and contacting them with a water mist in order to separate particles greater than 10μ;
(b) recycling said particles greater than 10μ to the starting waste material;
(c) oxidizing the remaining volatile metals and exhaust products to form volatile metal oxides and carbon dioxide.

8. The process according to claim 1, wherein said industrial waste materials comprise metal-containing waste products.

9. The process according to claim 8, wherein said metal-containing waste products comprise metals selected from the group consisting of reducible metals, non-reducible metals oxides and volatile metals.

10. The process according to claim 1, wherein said carbonaceous reducing agent is derived from carbon containing commercial products.

11. The process according to claim 10, wherein said carbonaceous reducing agent is selected from the group consisting of activated carbon, coke breeze, carbon or petroleum coke used to produce electrodes.

12. The process according to claim 1, wherein said carbonaceous reducing agent is derived from industrial waste materials containing fixed carbon.

13. The process according to claim 12, wherein said waste material is spent aluminum potliner.

14. The process according to claim 12, wherein said waste material is baghouse dust.

15. The process according to claim 12, wherein said waste material is waste water treatment sludges from electroplating operations bearing the EPA designated waste number F006.

16. The process according to claim 1, wherein said primary fluxing agent is derived from calcium-containing commercial products.

17. The process according to claim 16, wherein said calcium product is lime.

18. The process according to claim 1, wherein said primary fluxing agent is derived from calcium-containing industrial waste materials.

19. The process according to claim 18, wherein said industrial waste material is lime-stabilized waste materials.

20. The process according to claim 1, wherein said blend further comprises an aluminum reducing agent.

21. The process according to claim 20, wherein said aluminum reducing agent is derived from industrial waste materials.

22. The process according to claim 21, wherein said aluminum reducing agent is derived from spent aluminum potliner.

23. The process according to claim 1, wherein said blend further comprises at least one additional component selected from the group consisting of binding agents and secondary fluxing agents.

* * * * *